United States Patent
Fujimoto et al.

(10) Patent No.: US 12,001,895 B2
(45) Date of Patent: Jun. 4, 2024

(54) SERVER DELAY CONTROL SYSTEM, SERVER DELAY CONTROL DEVICE, SERVER DELAY CONTROL METHOD, AND PROGRAM

(71) Applicant: Nippon Telegraph and Telephone Corporation, Tokyo (JP)

(72) Inventors: Kei Fujimoto, Musashino (JP); Maiko Arai, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/766,906

(22) PCT Filed: Oct. 8, 2019

(86) PCT No.: PCT/JP2019/039616
§ 371 (c)(1),
(2) Date: Apr. 6, 2022

(87) PCT Pub. No.: WO2021/070240
PCT Pub. Date: Apr. 15, 2021

(65) Prior Publication Data
US 2023/0028832 A1      Jan. 26, 2023

(51) Int. Cl.
*G06F 3/00*         (2006.01)
*G06F 9/54*         (2006.01)
(Continued)

(52) U.S. Cl.
CPC ............... *G06F 9/54* (2013.01); *G06F 13/14* (2013.01); *H04L 47/622* (2013.01)

(58) Field of Classification Search
CPC ..................................................... G06F 9/541
(Continued)

(56) References Cited

U.S. PATENT DOCUMENTS 6,047,338 A * 4/2000 Grolemund ......... H04L 49/9057
710/39
7,613,813 B2 * 11/2009 Hussain .................. H04L 49/90
710/316
(Continued)

FOREIGN PATENT DOCUMENTS

CA        2655880 A1 * 12/2007 ........... G06F 15/173
CN      100380334 C  *  4/2008 ........... G06F 11/2005
(Continued)

OTHER PUBLICATIONS

R. Gopalakrishnan, Efficient User-Space Protocol Implementations with QoS Guarantees Using Real-Time Upcalls. (Year: 1998).*
(Continued)

*Primary Examiner* — Lechi Truong
(74) *Attorney, Agent, or Firm* — Fish & Richardson P.C.

(57) ABSTRACT

Provided is a server delay control system for performing, on a server including a Host OS, packet transfer between a physical NIC connected to the Host OS and an application deployed in a user space. A server delay control device configured to perform polling for packet transfer on behalf of the application is deployed in the user space. The server delay control device creates, between the application and the physical NIC, a communication path for communication via socket communication. The communication path includes a first queue and a second queue. The server delay control device includes: a packet dequeuer configured to poll whether a packet has been enqueued into the first queue and to dequeue the enqueued packet from the first queue; and a packet enqueuer configured to enqueue the dequeued packet into the second queue in the same context as the polling and dequeuing without causing a context switch.

7 Claims, 7 Drawing Sheets

(51) Int. Cl.
*G06F 13/14* (2006.01)
*H04L 47/62* (2022.01)

(58) Field of Classification Search
USPC .......................................................... 719/314
See application file for complete search history.

(56) References Cited

U.S. PATENT DOCUMENTS

| | | | |
|---|---|---|---|
| 2003/0058880 A1* | 3/2003 | Sarkinen | H04L 47/50 370/413 |
| 2005/0147032 A1* | 7/2005 | Lyon | H04L 47/125 370/229 |
| 2006/0136570 A1* | 6/2006 | Pandya | H04L 69/161 709/217 |
| 2013/0024875 A1* | 1/2013 | Wang | G06F 9/542 719/318 |
| 2015/0049769 A1 | 2/2015 | Tamir et al. | |
| 2018/0191623 A1* | 7/2018 | Marty | G06F 15/167 |
| 2019/0138324 A1* | 5/2019 | Hu | G06F 9/45558 |
| 2022/0058047 A1* | 2/2022 | Epstein | G06F 9/5055 |

FOREIGN PATENT DOCUMENTS

| | | | | |
|---|---|---|---|---|
| JP | 2015-036991 | 2/2015 | | |
| JP | 2015-197874 | 11/2015 | | |
| JP | 2018-032156 | 3/2018 | | |
| WO | WO-2007045839 A2 * | 4/2007 | ........... | G06F 16/951 |
| WO | WO-2008117272 A2 * | 10/2008 | ............. | G06F 9/541 |
| WO | WO-2010020646 A2 * | 2/2010 | ........... | G06F 9/5027 |
| WO | WO-2021070240 A1 * | 4/2021 | ............. | G06F 13/14 |

OTHER PUBLICATIONS

Dhulfiqar A Alwahab, A Simulation-Based Survey of Active Queue Management Algorithms. (Year: 2018).*
Pablo Neira-Ayuso, Communicating between the kernel and user-space in Linux using Netlink sockets, (Year: 2010).*
[No Author Listed] [online], "Soft Patch Panel—DPDK resources management framework (v18.08.4—Documentation)," spp-18.08.4.zip, git.dpdk.org, Oct. 4, 2019, retrieved from URL <http://git.dpdk.org/apps/spp/tag/?h=v18.08.4>, 207 pages.

* cited by examiner

SERVER DELAY CONTROL SYSTEM, SERVER DELAY CONTROL DEVICE, SERVER DELAY CONTROL METHOD, AND PROGRAM

CROSS-REFERENCE TO RELATED APPLICATIONS

This is a National Stage Application of PCT Application No. PCT/JP2019/039616, filed on Oct. 8, 2019. The disclosure of the prior application is considered part of the disclosure of this application, and is incorporated in its entirety into this application.

TECHNICAL FIELD

The present invention relates to a server delay control system, a server delay control device, a server delay control method, and a program.

BACKGROUND ART

Against the background of advances in virtualization technology achieved through NFV (Network Functions Virtualization), systems are being constructed and operated on a per-service basis. Also, a mode called SFC (Service Function Chaining) is becoming mainstream, in which, based on the above-described mode of constructing a system on a per-service basis, service functions are divided into units of reusable modules and are operated on independent virtual machine (VM: Virtual Machine, container, etc.) environments, and thereby the service functions are used as needed in a manner as if they are components, and the operability is improved.

A hypervisor environment consisting of Linux (registered trademark) and a KVM (kernel-based virtual machine) is known as a technology for forming a virtual machine. In this environment, a Host OS (an OS installed on a physical server is called a "Host OS") in which a KVM module is incorporated operates as a hypervisor in a memory area called kernel space, which is different from user spaces. In this environment, the virtual machine operates in a user space, and a Guest OS (an OS installed on a virtual machine is called a Guest OS) operates in the virtual machine.

Unlike the physical server in which the Host OS operates, in the virtual machine in which the Guest OS operates, all hardware including network devices (such as Ethernet card devices) is controlled via registers, which is needed for interrupt processing from the HW (hardware) to the Guest OS and for writing from the Guest OS to the hardware. In such register-based control, the performance is generally lower than that in the Host OS environment because the notifications and processing that would have been executed by physical hardware are emulated virtually by software.

Regarding this performance degradation, as a technology for reducing HW emulation operations from, in particular, a Guest OS to a Host OS or an external process existing outside the virtual machine and for improving communication performance and versatility with a high-speed and unified interface, a device abstraction technology called virtio, which is a paravirtualization technology, has been developed, and has already been incorporated in and is currently being used in many general-purpose OSes such as Linux (registered trademark) and FreeBSD (registered trademark).

In virtio, regarding data input/output such as console input/output, file input/output, and network communication, as a unidirectional data transfer transport, data exchange and queue operations using a queue designed with a ring buffer are defined. By using the virtio queue specifications and preparing queues whose number and sizes are suitable for each device when the Guest OS starts up, communication between the Guest OS and the outside of its virtual machine can be realized merely through operations on the queues without performing hardware emulation.

Packet Transfer Using an Interrupt Model (Example of General-Purpose VM Configuration)

PTL 1 describes a virtual communication channel construction system in which a Guest OS operating in a virtual machine constructs a dedicated virtual communication channel for communication with an external process that exists outside the virtual machine. The technique described in PTL 1 speeds up packet transfer processing by reducing the number of virtio-net related memory copy operations between the Host OS and the Guest OS connected by virtio.

Figure 6:
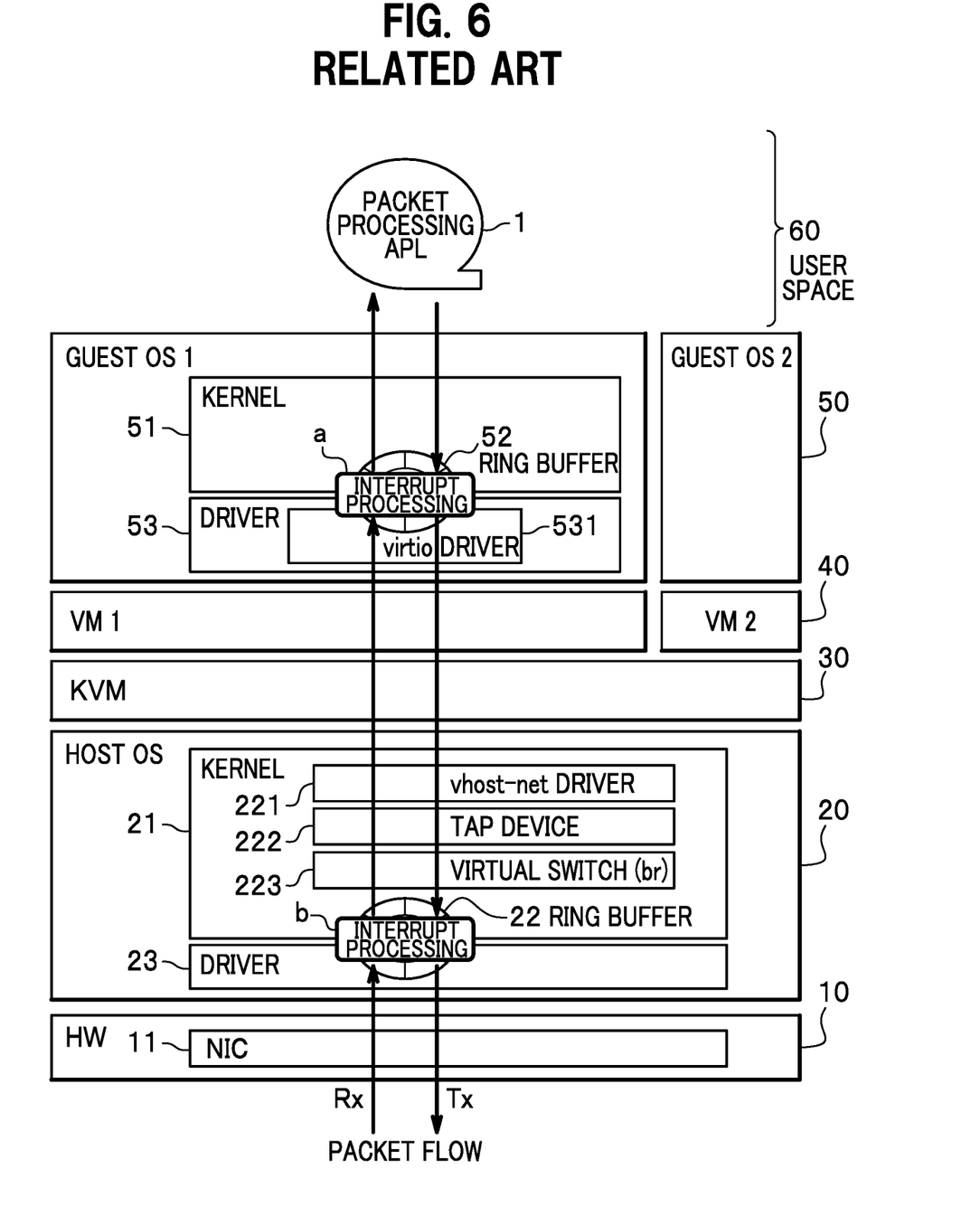
FIG. 6 is a diagram illustrating packet transfer operations performed according to an interrupt model in a server virtualization environment which is configured with a general-purpose Linux kernel and a VM.

FIG. 6 is a diagram illustrating packet transfer operations performed according to the interrupt model in a server virtualization environment which is configured with a general-purpose Linux kernel (registered trademark) and a VM.

HW 10 includes an NIC 11 (physical NIC), and performs communication for data transmission and reception with a packet processing APL (Application) 1 in a user space 60 via a virtual communication channel constructed by a Host OS 20, a KVM 30, which is a hypervisor that constructs virtual machines, virtual machines (VM 1, VM 2) 40, and a Guest OS 50. In the following description, as indicated by the thick arrows in FIG. 6, the data flow in which the packet processing APL 1 receives a packet from the HW 10 is referred to as "Rx-side reception", and the data flow in which the packet processing APL 1 transmits a packet to the HW 10 is called "Tx-side transmission".

The Host OS 20 includes a kernel 21, a Ring Buffer 22, and a Driver 23. The kernel 21 includes a vhost-net driver 221, a TAP device 222, and a virtual switch (br) 223.

The TAP device 222 is a kernel device of a virtual network and is supported by software. The virtual machine (VM 1) 40 is configured such that the Guest OS 50 and the Host OS 20 can communicate via the virtual switch (br) 223 created in a virtual bridge. The Guest OS 50 and the external network (in this case, HW 10) must also communicate via the Host OS 20. The TAP device 222 is a device connected to a Guest OS 50's virtual NIC (vNIC) created in this virtual bridge.

The Host OS 20 copies the configuration information (sizes of shared buffer queues, number of queues, identifiers, information on start addresses for accessing the ring buffers, etc.) constructed in the virtual machine of the Guest OS 50 to the vhost-net driver 221, and constructs, inside the Host OS 20, information on the endpoint on the virtual machine side. That is, the vhost-net module is a kernel-level back end for virtio networking, and can reduce virtualization overhead by moving virtio packet processing tasks from the user area (user space) to the vhost-net driver 221 of the kernel 21.

The Guest OSes 50 include a Guest OS (Guest 1) installed on the virtual machine (VM 1) and a Guest OS (Guest 2) installed on the virtual machine (VM 2), and the Guest OSes 50 (Guest 1, Guest 2) operate in the virtual machines (VM 1, VM 2) 40. Taking Guest 1 as an example of the Guest OSes 50, the Guest OS 50 (Guest 1) includes a kernel 51, a Ring Buffer 52, and a Driver 53, and the Driver 53 includes a virtio-driver 531.

Specifically, as PCI (Peripheral Component Interconnect) devices, there are respective virtio devices for console input/output, file input/output, and network communication in the virtual machine (the device for the console, which is called virtio-console, the device for file input/output, which is called virtio-blk, and the device for the network, which is called virtio-net, and their corresponding drivers included in the OS are each defined with a virtio queue). When the Guest OS starts up, two data transfer endpoints (transmission/reception endpoints) for each device are created between the Guest OS and the counterpart side, and a parent-child relationship for data transmission and reception is constructed. In many cases, the parent-child relationship is formed between the virtual machine side (child side) and the Guest OS (parent side).

The child side exists as configuration information of each device in the virtual machine, and requests the size of each data area, the number of combinations of needed endpoints, and the type of the device to the parent side. In accordance with the request from the child side, the parent side allocates and maintains memory for a shared buffer queue for accumulating and transferring the needed amount of data, and sends the address of the memory as a response to the child side so that the child side can access it. Operations of the shared buffer queue necessary for data transfer are uniformly defined in virtio, and are performed in a state where both the parent side and the child side have agreed on the definition. Furthermore, the size of the shared buffer queue also has been agreed on by both sides (i.e., it is determined for each device). As a result, it is possible to operate the queue shared by both the parent side and the child side by merely communicating the address to the child side.

As each shared buffer queue prepared in virtio is prepared for one direction, for example, a virtual network device called a virtio-net device is constituted by three Ring Buffers 52 for transmission, reception, and control. Communication between the parent and the child is realized by writing to the shared buffer queue and performing a buffer update notification. That is, after writing to the Ring Buffer 52, a notification is made to the counterpart. Upon receipt of the notification, the counterpart side uses common operations of virtio to check which shared buffer queue contains the new data and check how much the new data is, and retrieves a new buffer area. As a result, transfer of data from the parent to the child or from the child to the parent is achieved.

As described above, by sharing the Ring Buffer 52 for mutual data exchange and the operation method (used in common in virtio) for each ring buffer between the parent and the child, communication between the Guest OS 50 and the outside, which does not require hardware emulation, is realized. This makes it possible to realize transmission and reception of data between the Guest OS 50 and the outside at a high speed compared to conventional hardware emulation.

If the Guest OS 50 in the virtual machine communicates with the outside, the child side needs to connect to the outside and transmit and receive data as a relay between the outside and the parent side. For example, communication between the Guest OS 50 and the Host OS 20 is one example. Here, if the outside is the Host OS 20, two patterns are present as existing communication methods.

In the first method (hereinafter referred to as "external communication method 1"), a child-side endpoint is constructed in the virtual machine, and a communication between the Guest OS 50 and the Host OS 20 is connected in the virtual machine to a communication endpoint (usually called a "TAP/TUN device") provided by the Host OS 20, thereby to construct a connection as follows and thus realize communication from Guest OS 50 to the Host OS 20.

In this case, as the Guest OS 50 operates in a memory area that is a user space having privileges different from a memory area called kernel space, in which the tap driver and the Host OS 20 operate, at least one memory copy occurs in the communication from the Guest OS 50 to the Host OS 20.

In the second method (hereinafter referred to as "external communication method 2"), a technology called vhost-net exists as means for solving this. vhost-net is a technology that enables operations on shared buffer queues to be carried out directly between the Guest OS 50 and the Host OS 20 by copying parent-side configuration information (sizes of shared buffer queues, number of queues, identifiers, information on start addresses for accessing ring buffers, etc.) constructed once in the virtual machine to a vhost-net driver 221 inside the Host OS 20 and constructing, in the host, information on the endpoints of the child side. As a result, the number of copy operations is substantially zero, and data transfer can be realized at a higher speed than the external communication method 1 because the number of copy operations is less by one compared to virtio-net.

In this manner, in the case of Host OS 20 and the Guest OS 50 connected by virtio, packet transfer processing can be sped up by reducing the number of virtio-net related memory copy operations.

Note that in kernel v4.10 (February 2017-) and later, the specifications of the tap interface have changed, and packets inserted from the TAP device are completed in the same context as the processing of copying packets to the TAP device. Accordingly, software interrupts (softIRQ) no longer occur.

Packet Transfer Using a Polling Model (Example of DPDK)

The method of connecting and coordinating virtual machines is called Inter-VM Communication, and in large-scale environments such as data centers, virtual switches have been typically used in connections between VMs. However, since it is a method with a large communication delay, faster methods have been newly proposed. For example, a method of using special hardware called SR-IOV (Single Root I/O Virtualization), a method performed with software using Intel DPDK (Intel Data Plane Development Kit) (hereinafter referred to as DPDK), which is a high-speed packet processing library, and the like have been proposed (see NPL 1).

DPDK is a framework for controlling an NIC (Network Interface Card), which was conventionally controlled by a Linux kernel (registered trademark), in a user space. The biggest difference from the processing in the Linux kernel is that it has a polling-based reception mechanism called PMD (Pull Mode Driver). Normally, with a Linux kernel, an interrupt occurs upon arrival of data on the NIC, and this interrupt triggers the execution of reception processing. On the other hand, in a PMD, a dedicated thread continuously checks arrival of data and performs reception processing. High-speed packet processing can be performed by eliminating the overhead of context switching, interrupts, and the like. DPDK significantly increases packet processing performance and throughput, making it possible to ensure more time for data plane applications.

DPDK exclusively uses computer resources such as a CPU (Central Processing Unit) and an NIC. For this reason, it is difficult to apply it to an application, such as SFC, that flexibly reconnects in units of modules. There is SPP (Soft Patch Panel), which is an application for mitigating this. SPP omits packet copy operations in the virtualization layer by adopting a configuration in which shared memory is prepared between VMs and each VM can directly reference the same memory space. Also, DPDK is used to speed up exchanging packets between a physical NIC and the shared memory. In SPP, the input destination and output destination of a packet can be changed by software by controlling the reference destination for the memory exchange by each VM. In this manner, SPP realizes dynamic connection switching between VMs, and between a VM and a physical NIC.

PTL 2 describes a server delay control system, which is a virtual machine connection control system that causes a plurality of virtual machines to operate. The server delay control system includes: an SPP server having an SPP (Soft Patch Panel) that manages resources including the virtual machines; and a GUI terminal that, in cooperation with the SPP server, performs, through GUI (Graphical User Interface) operations, resource allocation and route setting for connecting the virtual machines. The technology described in PTL 2 provides a virtual machine connection control system that abstracts the operations of the SPP and allows operations of the SPP to be performed intuitively through a GUI.

Figure 7:
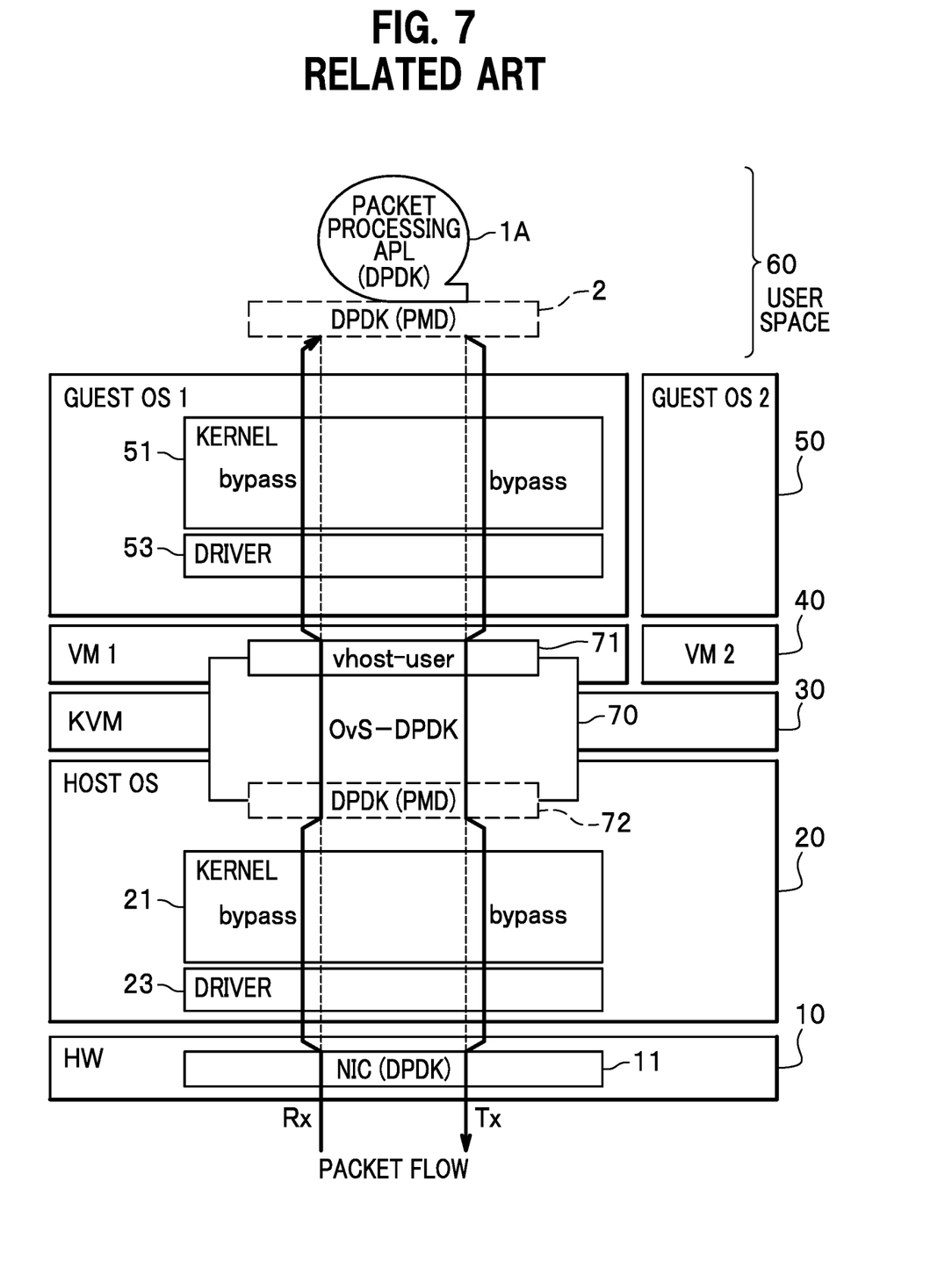
FIG. 7 is a diagram illustrating packet transfer based on the polling model in an OvS-DPDK configuration.

FIG. 7 is a diagram illustrating packet transfer performed based on a polling model in an OvS-DPDK (Open vSwitch with DPDK) configuration. The same components as those in FIG. 6 are denoted by the same reference numerals thereas, and descriptions of overlapping portions are omitted.

As illustrated in FIG. 7, the Host OS 20 includes an OvS-DPDK 70, which is software for packet processing; and the OvS-DPDK 70 includes a vhost-user 71, which is a functional part for connecting to a virtual machine (here, VM 1), and a dpdk (PMD) 72, which is a functional part for connecting to the NIC (DPDK) 11 (physical NIC).

Also, a packet processing APL 1A includes a dpdk (PMD) 2, which is a functional part that performs polling in the Guest OS 50 section. That is, the packet processing APL 1A is an APL obtained by modifying the packet processing APL 1 to equip the packet processing APL 1 of FIG. 6 with dpdk (PMD) 2.

As an extension of DPDK, packet transfer performed based on the polling model enables a routing operation using a GUI in an SPP that rapidly performs packet copy operations between the Host OS 20 and the Guest OS 50 and between the Guest OSes 50 via shared memory with zero-copy operation.

CITATION LIST

Patent Literature

[PTL 1] JP 2015-9197874A
[PTL 2] JP 2018-32156A

Non-Patent Literature

[NPL 1] Soft Patch Panel, [online], [searched for on Sep. 20, 2019], Internet <URL: http://dpdk.org/browse/apps/spp/>

SUMMARY OF THE INVENTION

Technical Problem

However, both the packet transfer based on the interrupt model and packet transfer based on the polling model have the following problems.

In the interrupt model, the kernel that receives an event (hardware interrupt) from the HW performs packet transfer through software interrupt processing for performing packet processing. As the interrupt model transfers packets through interrupt (software interrupt) processing, there is a problem in that when a conflict with other interrupts occurs and/or when the interrupt destination CPU is in use by a process with a higher priority, a wait occurs, and thus the delay in packet transfer increases. In this case, if the interrupt processing is congested, the wait delay further increases.

For example, as illustrated in FIG. 6, in packet transfer based on the interrupt model, a packet is transferred through interrupt processing (see symbols a and b in FIG. 6), and therefore a wait of the interrupt processing occurs and the delay in packet transfer increases.

A supplemental description of the mechanism by which a delay occurs in the interrupt model will be given.

In a general kernel, in packet transfer processing, transmission is performed in software interrupt processing after hardware interrupt processing.

When a software interrupt for packet transfer processing occurs, the software interrupt processing cannot be executed immediately under the following conditions, and thus a wait in the order of milliseconds occurs due to the software interrupt processing being mediated and scheduled by a scheduler such as ksoftirqd (kernel thread for each CPU; executed when the load of the software interrupt becomes high).

(1) When there is a conflict with other hardware interrupt processing
(2) When there is a conflict with other software interrupt processing
(3) When the interrupt destination CPU is used by another process or a kernel thread (migration thread, etc.), which has a higher priority.

Under the above conditions, the software interrupt processing cannot be executed immediately.

On the other hand, in the polling model, the CPU is occupied to poll the communication queue and dequeuing is performed immediately when a packet arrives (the content of a packet stored in the buffer is referenced, and the corresponding queue entry is removed from the buffer with consideration given to the processing of the packet and the processing that is to be performed next). Although the polling model can reduce the transfer delay, it is necessary to equip the APL with a polling function, and therefore the APL needs to be modified.

For example, as illustrated in FIG. 7, in packet transfer based on the polling model, it is necessary to equip the packet processing APL 1 with dpdk (PMD) 2, which is a functional part for performing polling in the Guest OS 50 section, and thus it is necessary to modify the packet processing APL 1.

The present invention has been made in view of such a background, and an object of the present invention is to perform packet transfer with a reduced delay in a server without modifying an APL.

Means for Solving the Problem

In order to solve the above-described problems, the present invention is a server delay control system for performing, on a server including a Host OS, packet transfer between an application and a physical NIC connected to the Host OS, the server implemented using a computer including one or more hardware processors, the application deployed in a user space that can be used by a user. A server delay control device implemented using one or more of the one or more hardware processors and configured to perform polling for packet transfer on behalf of the application is deployed in the user space. The server delay control device is further configured to create, between the application and the physical NIC, a communication path for communication via socket communication, the communication path comprising a first queue and a second queue. The server delay control device includes: a packet dequeuer configured to perform polling whether a packet has been enqueued into the first queue and to perform dequeuing the enqueued packet from the first queue, and a packet enqueuer configured to perform enqueuing the dequeued packet into the second queue. The packet dequeuer and the packet enqueuer are configured such that the polling and the dequeuing by the packet dequeuer and the enqueuing by the packet enqueuer are performed in a single context without causing a context switch.

Effects of the Invention

According to the present invention, packet transfer can be performed with a reduced delay in the server without modifying the APL.

DESCRIPTION OF EMBODIMENTS

Figure 1:
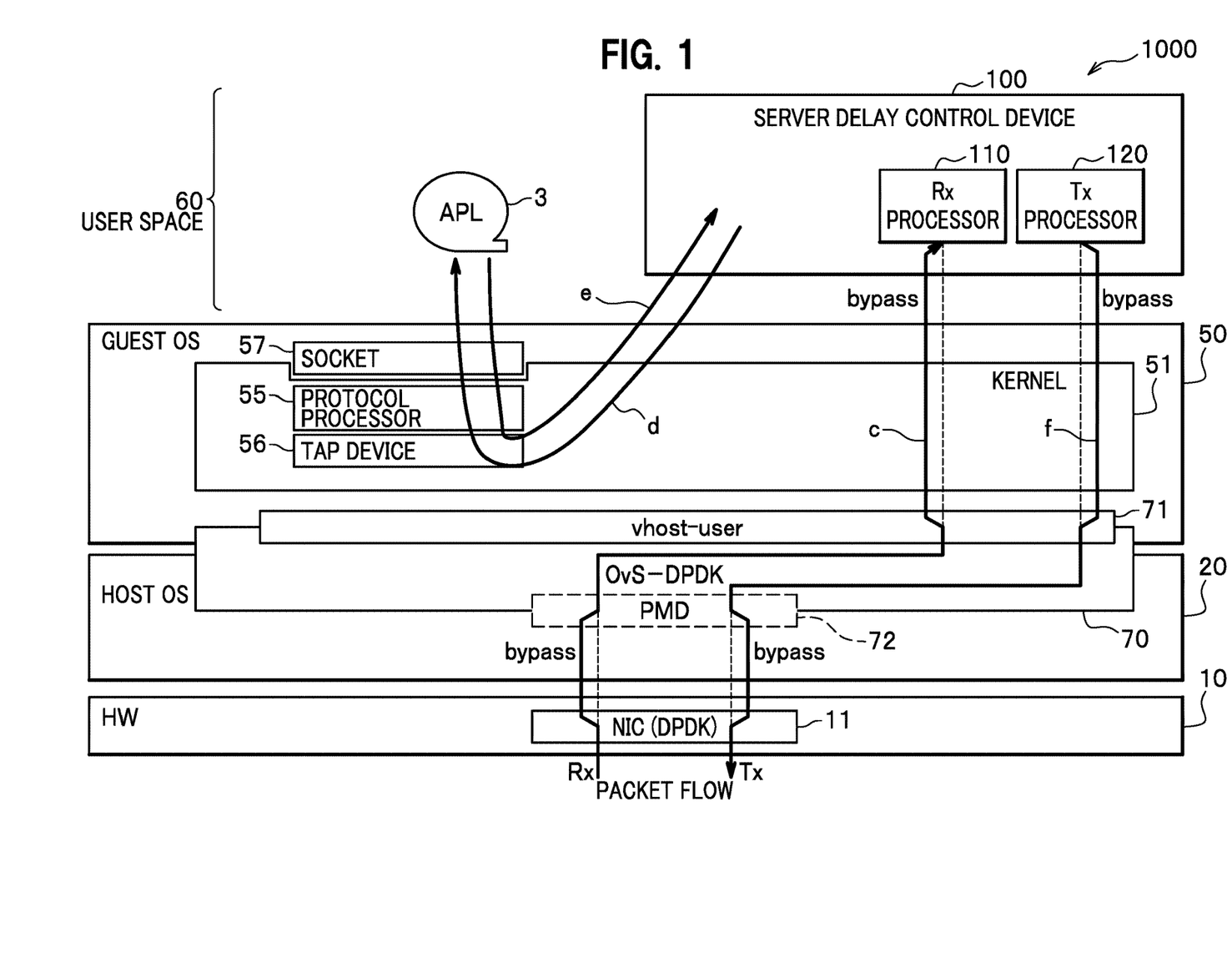
FIG. 1 is a schematic configuration diagram of a server delay control system according to an embodiment of the present invention.

Hereinafter, a server delay control system and the like in a mode for carrying out the present invention (hereinafter, referred to as "the present embodiment") will be described with reference to the drawings.
Overview
FIG. 1 is a schematic configuration diagram of a server delay control system according to an embodiment of the present invention. The present embodiment is an example applied to a packet transfer based on the polling model in an OvS-DPDK (Open vSwitch with DPDK) configuration. The same components as those in FIG. 7 are denoted by the same reference numerals thereas.

As illustrated in FIG. 1, a server delay control system 1000 is a system that executes, on a server including a Host OS 20 (described later), an APL 3 deployed in a user space 60 (described later), which can be used by a user, and performs packet transfer between an NIC (DPDK) 11 (physical NIC) connected to the Host OS 20 and the APL 3.

The server delay control system 1000 includes: HW 10 including a physical NIC 11; the Host OS 20, on which a virtual machine (VM) and an external process created outside the virtual machine can operate; a Guest OS 50 that operates inside the virtual machine;
an OvS-DPDK 70 that connects a virtual communication channel between the Guest OS 50 and the Host OS 20; and
a server delay control device 100 that performs polling for packet transfer on behalf of the APL 3, in the user space 60 where the APL 3 is executed.

The user space 60 is a user space that is provided when the user wants to perform an operation on the server, as opposed to providing a function to be used for general purposes in the kernel as a shared part. For example, APLs (applications) executed in the user space 60 include a Web service, a DNS (Domain Name System) service, and the like.

The APL 3 is an APL that is to be executed in the user space 60 and includes a packet processing APL 1A (see FIG. 7). In the present embodiment, a case where the APL 3 is a packet processing APL is taken as an example.

Here, when the HW 10 side is viewed from the user space 60 illustrated in FIG. 1, the Guest OS 50 and the Host OS 20 are in the server virtualization environment, and this server virtualization environment can be called a "server section" (or simply a "server").

The server delay control device 100 is deployed in the user space 60 where the APL 3 is executed, between the Guest OS 50 and the APL 1.

The server delay control device 100 is an APL high-speed interwork functional part that is deployed in the same user space 60 as the APL 3, and performs polling for packet transfer on behalf of this APL 3.

The server delay control device 100 includes an Rx processor 110 and a Tx processor 120.

The Rx processor 110 and the Tx processor 120 perform polling on behalf of the APL 3, and perform immediate packet dequeuing (removing a corresponding queue entry from the buffer in which the packet has arrived, on the basis of processing to be performed next), and perform packet transfer through packet communication in which no interrupt occurs to the APL 3.

The Rx processor 110 receives the packet from the HW 10 (see arrow c in FIG. 1) and transfers the packet to the APL 3 via the kernel 51 in the same context using a socket 57 without generating an interrupt (see arrow d in FIG. 1).

The Tx processor 120 transfers the packet sent from the APL 3 via the socket 57 and the kernel 51 (see arrow e in FIG. 1) to a vNIC 58 (see FIG. 2) via the kernel 51 in the same context without causing an interrupt (see arrow f in FIG. 1).

The HW 10 includes the physical NIC 11 and performs communication for data transmission and reception with the APL 3 (e.g., may also be the packet processing APL 1 illustrated in FIG. 6) in the user space 60 via a virtual communication channel constructed by the Host OS 20, the OvS-DPDK 70, and the Guest OS 50.

The Host OS 20 includes the OvS-DPDK 70, which is software for packet processing. The OvS-DPDK 70 includes: a vhost-user 71, which is a functional part for connecting to a virtual machine (VM); and a dpdk (PMD) 72, which is a functional part for connecting to the NIC (DPDK) 11.

The Guest OS 50 includes the kernel 51 and the Socket 57, which is an interface for the kernel 51 to perform inter-process communication. The kernel 51 includes a protocol processor 55 and a TAP device 56.

The kernel 51 is a function of a core portion of the Guest OS 50 and manages program execution states in units of processes. Here, the kernel 51 responds to requests from the APL 3 and conveys requests from the HW 10 to the APL 3. In response to a request from the APL 3, the kernel 51 performs processing via a system call (a "user program operating in a non-privileged mode" requests processing to a "kernel operating in a privileged mode").

The kernel 51 transmits packets to the APL 3 via the Socket 57. The kernel 51 stores the packets in a Tx queue (transmission queue) 562 of the TAP device 56 (see FIG. 2; denoted by only "Tx" for convenience of notation).

The kernel 51 receives packets from the APL 3 via the Socket 57.

The protocol processor 55 performs protocol processing of L2 (data link layer)/L3 (network layer)/L4 (transport layer), which are defined by the OSI (Open Systems Interconnection) reference model.

The protocol processor 55 performs protocol processing in the same context without causing a software interrupt.

Figure 2:
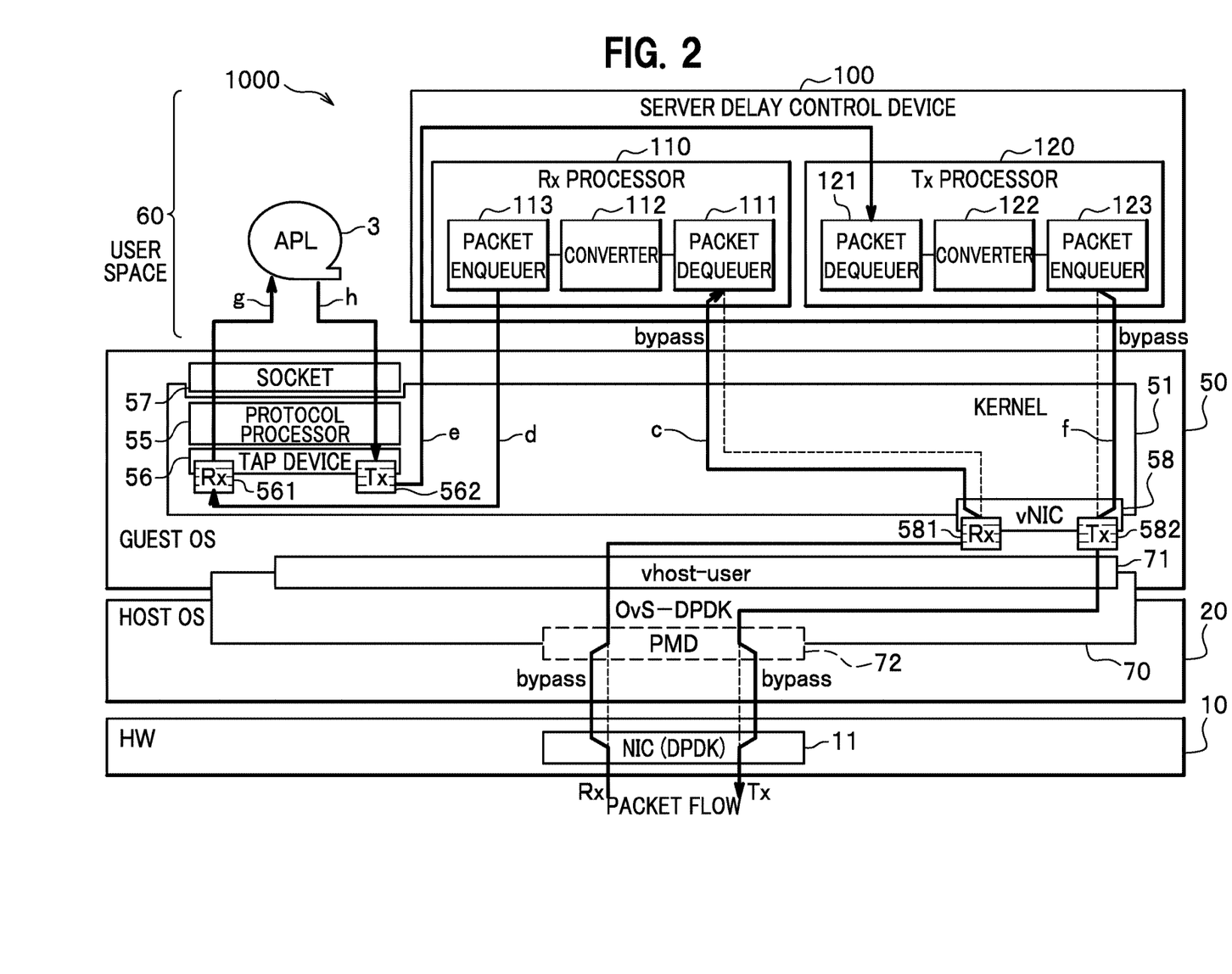
FIG. 2 is a detailed configuration diagram of the server delay control device of the server delay control system according to the embodiment of the present invention.

Specifically, the protocol processor 55 performs protocol processing in the same context for packets stored in an Rx queue (reception queue) 561 of the TAP device 56 without causing a software interrupt. Also, the protocol processor 55 performs protocol processing in the same context for packets received via the Socket 57 without causing a software interrupt.

The TAP device 56 is a kernel device of a virtual network and is supported by software. The TAP device 56 is a virtual interface device created by the kernel 51. For example, the kernel 51 can create a TAP device 56 and perform bridge processing on the TAP device 56. The generated TAP device 56 behaves like a virtual LAN card that is directly connected to a virtual HUB.

The TAP device 56 receives packets from a packet enqueuer 113 (see FIG. 2).

The Socket 57 is an interface for the kernel 51 to perform inter-process communication. The Socket 57 has a socket buffer and does not frequently generate data copy processing. The flow up to the establishment of communication via the Socket 57 is as follows. 1. The server side creates a socket file according to which the server side accepts clients. 2. Name the acceptance socket file. 3. Create a socket queue. 4. Accept a first connection from a client that is in the socket queue. 5. The client side creates a socket file. 6. The client side sends a connection request to the server. 7. The server side creates a connection socket file separately from the acceptance socket file. As a result of establishing communication, the APL 3 becomes able to call a system call such as read( ) and write( ) to the kernel 51.

Operations of the server delay control system 1000 with a schematic configuration will be described below.

The server delay control device 100 performs polling of packets in the user space 60 on behalf of the APL 3 (polling is performed from the user space 60 on behalf of the APL 3). Then, the server delay control device 100 immediately dequeues the packets, performs interwork with the kernel 51 on the Guest OS 50 using a route on which no interrupt occurs, and performs packet transfer through socket communication in which no interrupt occurs to the APL 3 (packet communication performed through the Socket 57 in FIG. 1) (see arrows c and f in FIG. 1).

The server delay control device 100 transfers the packets to the APL 3 via the kernel 51 on the Guest OS 50 using the socket 57 in the same context without causing an interrupt (see arrows e and d in FIG. 1).

Here, when the server delay control device 100 inserts a packet into the TAP device 56 on the Guest OS 50, the server delay control device 100 "runs to completion" in the same context until the packet is transferred to the APL 3. Therefore, there occurs no wait for context switching and the like, in which the flow of processing (process, thread) currently being executed by the CPU is temporarily stopped to switch to another one and then execution is resumed. As a result, processing is performed with a small delay.

With this configuration, the APL 3 can realize packet transfer without an interrupt while eliminating the need of being modified like the APL 1A (see FIG. 7). This enables low-delay packet transfer.

Detailed Configuration

FIG. 2 is a detailed configuration diagram of the server delay control device 100 of FIG. 1.

As illustrated in FIG. 2, the Rx processor 110 of the server delay control device 100 includes a packet dequeuer 111, a converter 112, and a packet enqueuer 113.

The kernel 51 on the Guest OS 50 includes a vNIC 58. The vNIC 58 includes an Rx queue 581 (denoted by only "Rx" for convenience of notation) and a Tx queue 582 (denoted by only "Tx" for convenience of notation).

Also, the TAP device 56 of the kernel 51 includes an Rx queue 561 and a Tx queue 562.

The packet dequeuer 111 references a packet that has arrived at the server and is held in the buffer, and performs, on the basis of the processing to be performed next, dequeuing to remove the corresponding queue entry from the buffer. Specifically, the packet dequeuer 111 performs busy polling (occupies CPU for constant monitoring) whether a packet sent from the vhost-user 71 (see FIG. 2) has arrived at the Rx queue 581 (see arrow c in FIG. 2) of the vNIC 58 (see FIG. 2). The packet dequeuer 111 dequeues the packet from the Rx queue 581 of the vNIC 58, and passes the dequeued packet to the converter 112 of the Rx processor 110.

The converter 112 converts the packet dequeued from the queue into a structure for socket communication in which no interrupt occurs. Specifically, the converter 112 performs conversion from mbuf (structure for use with DPDK to manage a packet) to sk_buff (structure in which the kernel 51 manages a packet) as needed.

The packet enqueuer 113 enqueues the packet into a queue for socket communication, on the basis of the structure resulting from the conversion. Specifically, the packet enqueuer 113 stores the received packet into the Rx queue 561 of the TAP device 56.

The Tx processor 120 of the server delay control device 100 includes a packet dequeuer 121, a converter 122, and a packet enqueuer 123.

The packet dequeuer 121 references a packet that has arrived and is held in the buffer, and performs, on the basis of the processing to be performed next, dequeuing to remove the corresponding queue entry from the buffer. The packet dequeuer 121 dequeues the packet from the Tx queue 562 of the TAP device 56.

The converter 122 converts the packet dequeued from the queue into a structure for socket communication in which no interrupt occurs. Specifically, the converter 122 performs conversion from sk_buff to mbuf as needed.

The packet enqueuer 123 enqueues the packet into the queue for socket communication on the basis of the structure resulting from the conversion. Specifically, the packet enqueuer 123 stores the received packet into the Tx queue 582 of the vNIC 58.

Deployment Conditions for Server Delay Control Device 100

A description will be given of deployment conditions for the server delay control device 100.

One server delay control device 100 is allocated for each VM/container. Alternatively, the number of allocated server delay control devices 100 is the same as the number of virtual network IFs of the virtual server. Note that, even if there are a plurality of APLs in the user space 60, a server delay control device 100 is not deployed for each APL. In this case, the protocol processor 55 of the kernel 51 illustrated in FIG. 2 handles the distribution of packets to each APL.

The server delay control system 1000 increases or decreases the number of CPU cores allocated to the server delay control device 100, according to the number of queues of the vhost-user multiqueue and the like. For example, if the number of traffic flows increases, the number of CPUs allocated to the server delay control device 100 is increased.

Operations of the server delay control system 1000 with a detailed configuration will be described below.

Rx-Side Operations

First, operations on the Rx side of the server delay control system 1000 will be described. The Rx-side operations include "operations of Rx processor 110" and "operations of Kernel 51 on Guest OS 50 (hereinafter abbreviated as "Guest kernel" as appropriate)".

Operations of Rx processor 110

Figure 3:
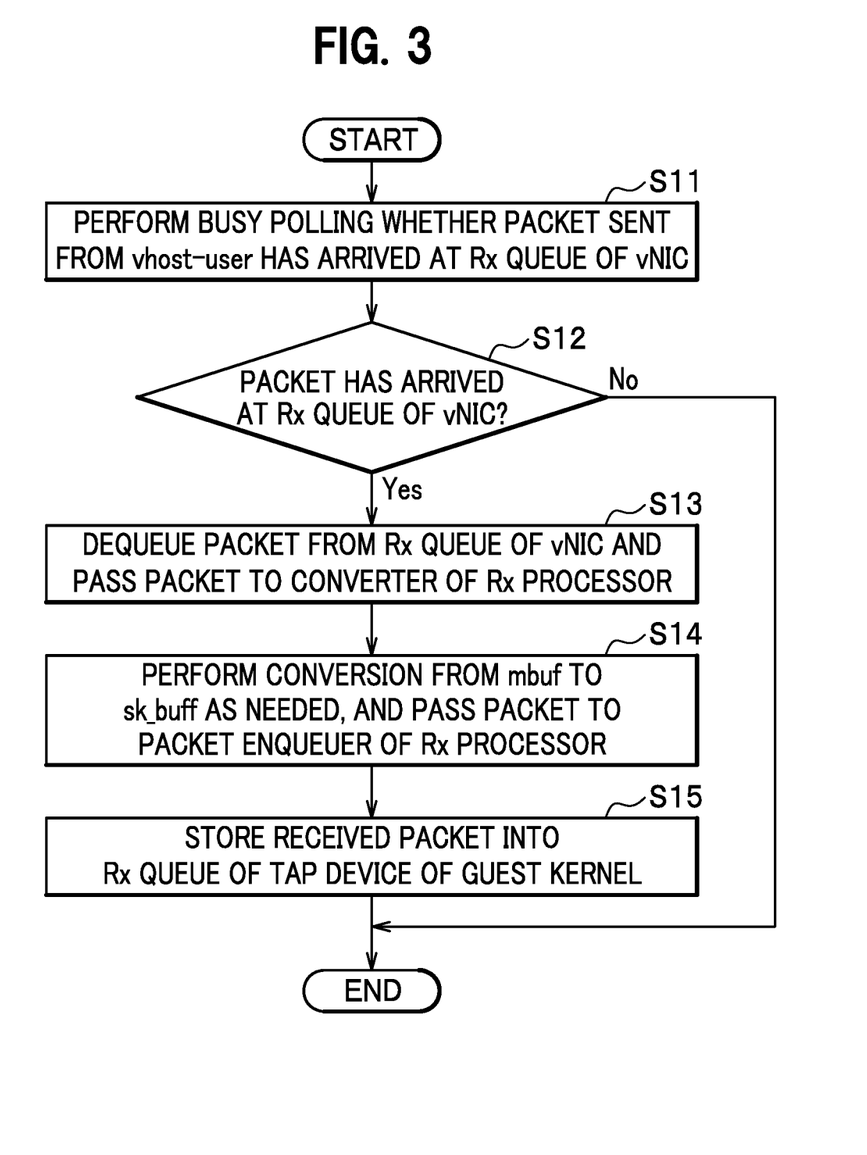
FIG. 3 is a flowchart illustrating Rx-side operations of the server delay control device of the server delay control system according to the embodiment of the present invention.

FIG. 3 is a flowchart illustrating Rx-side operations of the server delay control device 100 (see FIG. 2). The Rx-side operations will be described with reference to FIGS. 2 and 3.

In step S11, the packet dequeuer 111 (see FIG. 2) of the Rx processor 110 of the server delay control device 100 performs busy polling (occupies CPU for constant monitoring) whether a packet sent from the vhost-user 71 (see FIG. 2) has arrived at the Rx queue 581 of the vNIC 58 (see arrow c in FIG. 2).

In step S12, the packet dequeuer 111 of the Rx processor 110 determines whether a packet has arrived at the Rx queue 581 of the vNIC 58.

When a packet has arrived at the Rx queue 581 of the vNIC 58 (S12: Yes), in step S13, the packet dequeuer 111 of the Rx processor 110 dequeues the packet from the Rx queue 581 of the vNIC 58 and passes the dequeued packet to the converter 112 of the Rx processor 110 (see FIG. 2). At this time, as the same CPU is used, context switching does not occur.

If no packet has arrived at the Rx queue 581 of the vNIC 58 (S12: No), the processing of the present flow ends.

In step S14, the converter 112 of the Rx processor 110 performs conversion from mbuf (structure for use with DPDK to manage a packet) to sk_buff (structure in which the kernel 51 manages a packet) as needed, and passes the packet to the packet enqueuer 113 (see FIG. 2) of the Rx processor 110.

In step S15, the packet enqueuer 113 of the Rx processor 110 stores the received packet into the Rx queue 561 of the TAP device 56 of the Guest kernel (see the arrow d in FIG. 2), and the processing of the present flow ends. At this time, as the same CPU is used, context switching does not occur.

The above-described steps S11 to S15 operate in a Run-to-Completion Mode and are performed in the same context. The Run-to-Completion Mode is a mode in which, if, for example, process copying is to be performed between CPUs, a CPU continues to operate in the same context of the dequeued packet to complete passing the dequeued packet to the APL 3 via the protocol processing and a socket I/O without causing a context switching. By operating in the Run-to-completion Mode and performing execution in the same context, it is possible to reduce the delay.

Guest Kernel Operations

The TAP device 56 of the kernel 51 on the Guest OS 50 illustrated in FIG. 2 receives packets from the packet enqueuer 113 of the Rx processor 110 of the server delay control device 100. When the TAP device 56 receives a packet from the packet enqueuer 113, the protocol processor 55 calls, for example, netif_receive_skb, and performs protocol processing (L2/L3/L4 protocol processing) in the same context without causing a software interrupt. The kernel 51 transmits the packet to the APL 3 via a POSIX socket API of the Socket 57 (see arrow g in FIG. 2).

Tx-Side Operations

Next, the Tx-side operations of the server delay control system 1000 will be described. The Tx-side operations include "Guest Kernel operations" and "operations of Tx processor 120".

Guest Kernel Operations

The Guest kernel receives packets from the APL 3 (see FIG. 2) via the POSIX socket API of the Socket 57 (see arrow h in FIG. 2). In the Guest kernel that received the packets, the protocol processor 55 performs protocol processing (L2/L3/L4 protocol processing) and stores the packets in the Tx queue 562 of the TAP device 56.

Operations of Tx Processor 120

Figure 4:
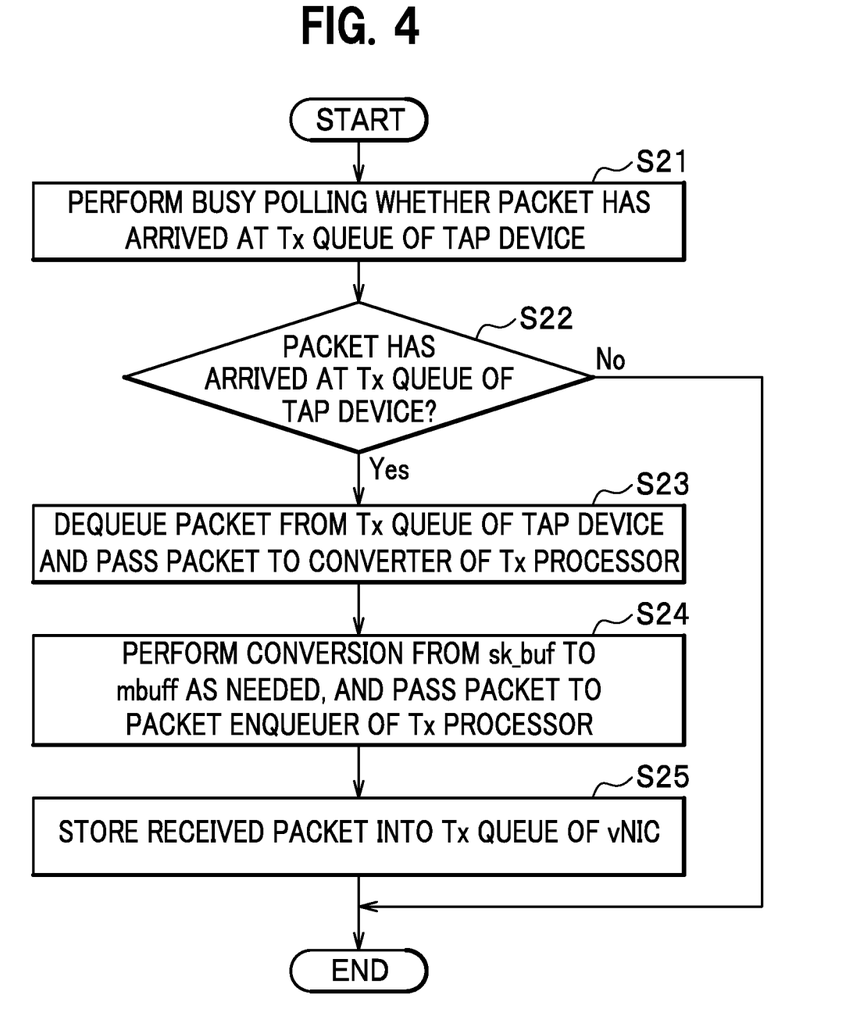
FIG. 4 is a flowchart illustrating Tx-side operations of the server delay control device of the server delay control system according to the embodiment of the present invention.

FIG. 4 is a flowchart illustrating Tx-side operations of the server delay control device 100 (see FIG. 2). The Tx-side operations will be described with reference to FIGS. 2 and 4.

In step S21, the packet dequeuer 121 (see FIG. 2) of the Tx processor 120 of the server delay control device 100 performs busy polling (occupies CPU for constant monitoring) whether a packet has arrived at the Tx queue 562 (see arrow e in FIG. 2) of the TAP device 56.

In step S22, the packet dequeuer 121 of the Tx processor 120 determines whether a packet has arrived at the Tx queue 562 of the TAP device 56.

If a packet has arrived at the Tx queue 562 of the TAP device 56 (S22: Yes), in step S23, the packet dequeuer 121 of the Tx processor 120 dequeues the packet from the Tx queue 562 of the TAP device 56, and passes the dequeued packet to the converter 122 (see FIG. 2) of the Tx processor 120. At this time, since the same CPU is used, context switching does not occur.

If no packet has arrived at the Tx queue 562 of the TAP device 56 (S22: No), the processing of the present flow ends.

In step S24, the converter 122 of the Tx processor 120 performs conversion from sk_buff to mbuf as needed, and passes the packet to the packet enqueuer 123 (see FIG. 2) of the Tx processor 120.

In step S25, the packet enqueuer 123 of the Tx processor 120 stores the received packet into the Tx queue 582 of the vNIC 58 (see the arrow f in FIG. 2), and ends the processing of the present flow. At this time, as the same CPU is used, context switching does not occur.

The above steps S21 to S25 operate in a Run-to-completion Mode and are performed in the same context. As a result, the delay can be reduced.

Hardware Configuration

Figure 5:
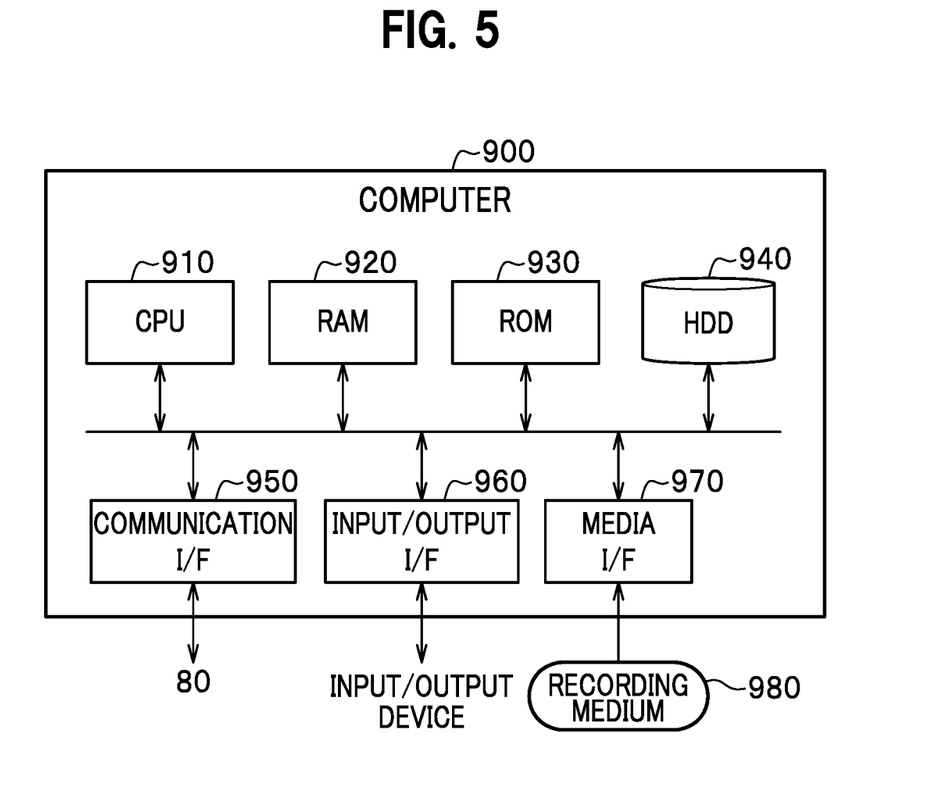
FIG. 5 is a hardware configuration diagram illustrating an example of a computer for realizing the functions of the server delay control device of the server delay control system according to the embodiment of the present invention.

The server delay control device 100 according to the present embodiment is realized by, for example, a computer 900 having a configuration as illustrated in FIG. 5.

FIG. 5 is a hardware configuration diagram illustrating an example of a computer 900 that realizes the functions of the server delay control device 100.

The computer 900 includes a CPU 910, a RAM 920, a ROM 930, an HDD 940, a communication interface (I/F: Interface) 950, an input/output interface (I/F) 960, and a media interface (I/F) 970.

The CPU 910 operates and performs control of each portion according to a program stored in the ROM 930 or the HDD 940. The ROM 930 stores a boot program to be executed by the CPU 910 when the computer 900 starts up, a program that relies on the hardware of the computer 900, and the like.

The HDD 940 stores programs to be executed by the CPU 910, data to be used by the programs, and the like. The communication interface 950 receives data from another device via a communication network 80, sends the received data to the CPU 910, and transmits data generated by the CPU 910 to another device via the communication network 80.

The CPU 910 controls an output device such as a display or a printer and an input device such as a keyboard or a mouse via the input/output interface 960. The CPU 910 receives data from the input device via the input/output interface 960. Also, the CPU 910 outputs generated data to the output device via the input/output interface 960.

The media interface 970 reads a program or data stored in a recording medium 980 and provides the read program or data to the CPU 910 via the RAM 920. The CPU 910 loads the program from the recording medium 980 onto the RAM 920 via the media interface 970 and executes the loaded program. The recording medium 980 is, for example, an optical recording medium such as a DVD (Digital Versatile Disc) or PD (Phase change rewritable Disk), a magneto-optical recording medium such as an MO (Magneto Optical disk), a tape medium, a magnetic recording medium, a semiconductor memory, or the like.

For example, if the computer 900 functions as a server delay control device 100 according to the present embodiment, the CPU 910 of the computer 900 realizes the function of each portion of the server delay control device 100 by executing the program loaded on the RAM 920. Also, the HDD 940 stores the data in each portion of the server delay control device 100. The CPU 910 of the computer 900 reads these programs from the recording medium 980 and executes them, but in another example, these programs may be received from another device via the communication network 80.

Effects

As described above, the server delay control system 1000 is a server delay control system for performing, on a server including the Host OS 20, packet transfer between the APL 3 and the physical NIC 11 connected to the Host OS 20, wherein the APL 3 is deployed in the user space 60 that can be used by the user. The server delay control device 100 configured to perform polling for packet transfer on behalf of the APL 3 is deployed in the user space 60. The server delay control device 100 includes: the packet dequeuers 111 and 121 configured to reference a packet that has arrived at the server and is held in a buffer and to perform, on the basis of processing to be performed next, dequeuing to remove a corresponding queue entry from the buffer; the converters 112 and 122 configured to convert the packet dequeued from the queue into a structure for socket communication in which no interrupt occurs; and the packet enqueuers 113 and 123 configured to enqueue the packet into a queue for the socket communication on the basis of the structure resulting from the conversion.

With this configuration, it is possible to perform packet transfer while reducing the delay in the server, without modifying the APL 3. That is, it is not necessary for the APL 3 to be equipped with a function for high-speed packet transfer (see dpdk (PMD) 2 in FIG. 7), and the APL 3 need only perform interwork with the existing POSIX socket API of the kernel. Furthermore, realization is possible without modifying the kernel.

Also, by increasing or reducing the number of CPU cores allocated to the server delay control device 100 according to the number or the like of queues of a vhost-user multiqueue, the server delay control system 1000 can scale out by allocating the CPUs to be used for packet processing when the number of traffic flows increases. For example, when the number of traffic flows increases, the number of CPUs allocated to the server delay control device 100 can be increased to enable scale-out with respect to the network load.

In the server delay control system 1000, the server includes: the Host OS 20, on which a virtual machine and an external process formed outside the virtual machine can operate; and the Guest OS 50 configured to operate in the virtual machine. The Guest OS 50 includes: the kernel 51; and the Socket 57, which is an interface for the kernel 51 to perform inter-process communication. The kernel 51 includes the TAP device 56, which is a virtual interface created by the kernel 51. The packet dequeuer 111 references a packet that has arrived at the server and is held in the buffer, and performs, on the basis of processing to be performed next, dequeuing to remove a corresponding queue entry from the buffer. The converter 112 converts the packet dequeued from the queue into a structure for socket communication in which no interrupt occurs. The packet enqueuer 113 enqueues the packet into the reception queue (Rx queue) 561 of the TAP device 561. The kernel 51 transmits a packet to the APL 3 via the Socket 57.

With this configuration, the Rx side in the server virtualization environment polls packets in the user space 60 on behalf of the APL 3, and performs interwork with the kernel 51 on the Guest OS 50 using a route on which no interrupt occurs. As a result, in the virtual server, it is possible to realize packet transfer with no interrupt without modifying the APL, and to enable packet transfer with a low delay.

In the server delay control system 1000, the server includes: the Host OS 20, on which a virtual machine and an external process formed outside the virtual machine can operate; and the Guest OS 50 configured to operate in the virtual machine. The Guest OS 50 includes: the kernel 51; and the Socket 57, which is an interface for the kernel 51 to perform inter-process communication. The kernel 51 includes the TAP device 56, which is a virtual interface created by the kernel 51. The kernel 51 stores the packet received via the Socket 57 in the transmission queue (Tx queue) 562 of the TAP device 56. The packet dequeuer 121 dequeues a packet from the transmission queue (Tx queue) 562 of the TAP device 56. The converter 122 converts the packet dequeued from the queue into a structure for socket communication in which no interrupt occurs. The packet enqueuer 123 transmits a packet to the outside of the server delay control device 100.

With this configuration, the Tx side in the server virtualization environment polls packets in the user space 60 and performs interwork with the kernel 51 on the Guest OS 50 using a route on which no interrupt occurs. As a result, in the virtual server, it is possible to realize packet transfer with no interrupt without modifying the APL, to enable packet transfer with low delay.

In the server delay control system 1000, the server includes: the Host OS 20, on which a virtual machine and an external process formed outside the virtual machine can operate; and the Guest OS 50 configured to operate in the virtual machine. The Guest OS 50 includes: the kernel 51; and the Socket 57, which is an interface for the kernel 51 to perform inter-process communication. The kernel 51 includes: the protocol processor 55 configured to perform protocol processing; and the TAP device 56, which is a virtual interface created by the kernel 51. The protocol processor 55 performs protocol processing on a packet stored in the reception queue 561 of the TAP device 56 in the same context without causing a software interrupt. The kernel 51 transfers the packet subjected to protocol processing to the application 3 via the Socket 57. The protocol processor 55 performs protocol processing in the same context on the packet received via the Socket 57 without causing a software interrupt. The kernel 51 stores the packet subjected to protocol processing into the transmission queue (Tx queue) 562 of the TAP device 56.

With this configuration, the TAP device 56 of the kernel 51 having received the packet from the packet enqueuer 113 calls, for example, netif_receive_skb, and then performs protocol processing (L2/L3/L4) thereafter in the same context without causing a software interrupt and transfers the packet to the APL 3 via the POSIX socket API. Also, the kernel 51 having received the packet from the APL 3 via the POSIX socket API performs protocol processing (L2/L3/L4) and stores the packet into the Tx queue 562 of TAP device 56.

As a result, when a packet is inserted into the TAP device 56, run-to-completion is performed until the packet is transferred to the APL 3 in the same context, and therefore there occurs no wait for context switching or the like, and processing with a small delay is realized. The above can be operated in a Run-to-completion Mode and is performed in the same context. As a result, the delay can be reduced even further.

The server delay control device 100 is deployed a server including the Host OS 20. The server delay control device 100 is deployed in the user space 60 that can be used by a user and includes: the packet dequeuers 111 and 121 configured to reference a packet that has arrived at the server and is held in a buffer and to perform, on the basis of processing to be performed next, dequeuing to remove a corresponding queue entry from the buffer; the converters 112 and 122 configured to convert the packet dequeued from the queue into a structure for socket communication in which no interrupt occurs; and the packet enqueuers 113 and 123 configured to enqueue the packet into a queue for the socket communication on the basis of the structure resulting from conversion.

With this configuration, it is possible to perform packet transfer while reducing the delay in the server, without modifying the APL.

The server delay control device 100 is to be deployed in the user space 60 to perform polling on behalf of the APL 3, and there is no limitation to the OS. Also, there is no limitation to being in a server virtualization environment. Accordingly, the server delay control device 100 can be applied to each of the following configurations (1)-(5).

(1) An OvS-DPDK configuration (configurations in FIGS. 1 and 2), (2) a Host OS and DPDK configuration (the Host OS is a Host OS configuration, the Guest OS is a DPDK configuration), (3) an SPP configuration (the Host OS and Guest OS are in an SPP configuration), (4) a pair metal configuration (non-virtualized configuration), and (5) a container configuration (Guest OS is replaced with a container, and the Host OS and container are in an OvS-DPDK configuration)

Note that the present invention can be applied to a system having a non-virtualized configuration such as the above-described (4) pair metal configuration. In a non-virtualized configuration system, packet transfer can be performed with a small delay in the server without modifying the APL 3.

Also, when applied to the systems of (1), (2), (3), and (5) above, in the virtual server/container in the server virtualization environment, packet transfer can be performed with a reduced delay in the server without modifying the APL 3.

Note that among the processes described in the above embodiments, all or some of the processes described as being automatically performed can also be manually performed, or all or some of the processes described as being manually performed can also be performed automatically using a known method. Also, the processing procedure, the control procedure, specific names, and information including various types of data and parameters, which have been described in the above-presented description and drawings can be changed as appropriate unless otherwise specified.

Also, each constituent element of the illustrated devices is a functional concept, and does not necessarily need to be physically configured as illustrated in the drawings. That is, the specific forms of the distribution and integration of the devices are not limited to those illustrated in the drawings, and all or some of the specific forms can be functionally or physically distributed or integrated in any unit according to various types of loads, usage conditions, and the like.

Also, the above configurations, functions, processing units, processing means, and the like may be realized by hardware by designing a part or all of them with, for example, an integrated circuit, or the like. Also, each of the above configurations, functions, and the like may be realized by software for the processor to interpret and execute a program for realizing each function. Information such as programs, tables, and files that realize each function can be stored in a memory, a recording device such as a hard disk, or an SSD (Solid State Drive), or a recording medium such as an IC (Integrated Circuit) card, an SD (Secure Digital) card, or an optical disk.

REFERENCE SIGNS LIST

3 APL (Application)
10 HW (hardware)
11 NIC (DPDK) (physical NIC)
20 Host OS
50 Guest OS
51 Kernel
57 Socket
55 Protocol processor
56 Tap device
58 vNIC (virtual NIC)
60 User space
70 OvS-DPDK
71 vhost-user
72 dpdk (PMD)
100 Server delay control device
110 Rx processor 111, 121 Packet dequeuer
112, 122 Converter
113, 123 Packet enqueuer
120 Tx processor
561, 581 Rx queue (reception queue)
562, 582 Tx queue (transmission queue)
1000 Server delay control system

The invention claimed is:

1. A server delay control system for performing, on a server including a Host OS, packet transfer between an application and a physical NIC connected to the Host OS, the server implemented using a computer comprising one or more hardware processors, the application deployed in a user space that can be used by a user,
wherein the server comprises:
a kernel; and
a Socket, which is an interface for the kernel to perform inter-process communication via socket communication,
wherein a server delay control device implemented using one or more of the one or more hardware processors and configured to perform polling for packet transfer on behalf of the application is deployed in the user space,
wherein the server delay control device is further configured to create, between the application and the physical NIC, a communication path for communication via the socket communication, the communication path comprising a first queue and a second queue,
wherein the server delay control device comprises:
a packet dequeuer configured to perform polling whether a packet has been enqueued into the first queue and to perform dequeuing the enqueued packet from the first queue;
a converter configured to perform conversion of the packet dequeued from the first queue into a structure for the kernel to manage a packet, and
a packet enqueuer configured to perform enqueuing the dequeued packet on which the conversion has been performed by the converter into the second queue,
wherein the kernel is configured to transfer the converted packet enqueued into the second queue to the application via the Socket, and
wherein the packet dequeuer, the converter, the packet enqueuer, and the kernel are configured such that the polling and the dequeuing by the packet dequeuer, the conversion by the converter, the enqueuing by the packet enqueuer, and the transfer by the kernel are performed in a single context without causing a context switch.

2. A server delay control system for performing, on a server including a Host OS, packet transfer between an application and a physical NIC connected to the Host OS, the server implemented using a computer comprising one or more hardware processors, the application deployed in a user space that can be used by a user,
wherein a server delay control device implemented using one or more of the one or more hardware processors and configured to perform polling for packet transfer on behalf of the application is deployed in the user space,
wherein the server delay control device is further configured to create, between the application and the physical NIC, a communication path for communication via socket communication, the communication path comprising a first queue and a second queue,
wherein the server delay control device comprises:
a packet dequeuer configured to perform polling whether a packet has been enqueued into the first queue and to perform dequeuing the enqueued packet from the first queue;
a converter configured to perform conversion of the packet dequeued from the first queue into a structure for managing a packet, and
a packet enqueuer configured to perform enqueuing the dequeued packet on which the conversion has been performed by the converter into the second queue,
wherein the packet dequeuer, the converter, and the packet enqueuer are configured such that the polling and the dequeuing by the packet dequeuer, the conversion by the converter, and the enqueuing by the packet enqueuer are performed in a single context without causing a context switch,
wherein the Host OS is configured such that a virtual machine and an external process created outside the virtual machine operate on the Host OS,
wherein the server further comprises a Guest OS configured to operate in the virtual machine,
wherein the Guest OS comprises:
a kernel; and
a Socket, which is an interface for the kernel to perform inter-process communication,
wherein the kernel comprises a TAP device, which is a virtual interface created by the kernel,
wherein the first queue is a first reception queue configured to hold a reception packet arrived at the server, the reception packet stored in a structure for the server delay control device to manage a packet and enqueued into the first reception queue,
wherein the second queue is a reception queue of the TAP device,
wherein the packet dequeuer is configured to perform polling whether the reception packet has been enqueued into the first reception queue and to perform dequeuing the reception packet from the first reception queue,
wherein the converter is configured to perform conversion of the reception packet dequeued from the first reception queue into a structure for the kernel to manage a packet,
wherein the packet enqueuer is configured to perform enqueuing the reception packet on which the conversion has been performed by the converter into the reception queue of the tap device,
wherein the kernel is configured to transfer the converted reception packet enqueued into the reception queue of the TAP device to the application via the Socket, and
wherein the packet dequeuer, the converter, the packet enqueuer, and the kernel are configured such that the polling and the dequeuing by the packet dequeuer, the conversion by the converter, the enqueuing by the packet enqueuer, and the transfer by the kernel are performed in the single context without causing a context switch.

3. A server delay control system for performing, on a server including a Host OS, packet transfer between an application and a physical NIC connected to the Host OS, the server implemented using a computer comprising one or more hardware processors, the application deployed in a user space that can be used by a user,
wherein a server delay control device implemented using one or more of the one or more hardware processors and configured to perform polling for packet transfer on behalf of the application is deployed in the user space,
wherein the server delay control device is further configured to create, between the application and the physical NIC, a communication path for communication via socket communication, the communication path comprising a first queue and a second queue, wherein the server delay control device comprises:
- a packet dequeuer configured to perform polling whether a packet has been enqueued into the first queue and to perform dequeuing the enqueued packet from the first queue;
- a converter configured to perform conversion of the packet dequeued from the first queue into a structure for managing a packet, and
- a packet enqueuer configured to perform enqueuing the dequeued packet on which the conversion has been performed by the converter into the second queue, wherein the packet dequeuer, the converter, and the packet enqueuer are configured such that the polling and the dequeuing by the packet dequeuer, the conversion by the converter, and the enqueuing by the packet enqueuer are performed in a single context without causing a context switch, wherein the Host OS is configured such that a virtual machine and an external process created outside the virtual machine operate on the Host OS, wherein the server further comprises a Guest OS configured to operate in the virtual machine, wherein the Guest OS comprises:
- a kernel; and
- a Socket, which is an interface for the kernel to perform inter-process communication, wherein the kernel comprises a TAP device, which is a virtual interface created by the kernel, wherein the first queue is a first transmission queue of the tap device, the first transmission queue configured to hold a transmission packet received by the kernel via the Socket, the transmission packet stored in a structure for the kernel to manage a packet and enqueued into the first transmission queue, wherein the second queue is a second transmission queue configured to hold a packet to be transmitted to an outside of the Guest OS, wherein the packet dequeuer is configured to perform polling whether the transmission packet has been enqueued into the first transmission queue and to perform dequeuing the transmission packet from the first transmission queue, wherein the converter is configured to perform conversion of the transmission packet dequeued from the first transmission queue into a structure for the server delay control device to manage a packet, wherein the packet enqueuer is configured to perform enqueuing the transmission packet on which the conversion has been performed by the converter into the second transmission queue, and wherein the packet dequeuer, the converter, and the packet enqueuer are configured such that the polling and the dequeuing by the packet dequeuer, the conversion by the converter, and the enqueuing by the packet enqueuer are performed in the single context without causing a context switch.

4. A server delay control system for performing, on a server including a Host OS, packet transfer between an application and a physical NIC connected to the Host OS, the server implemented using a computer comprising one or more hardware processors, the application deployed in a user space that can be used by a user, wherein a server delay control device implemented using one or more of the one or more hardware processors and configured to perform polling for packet transfer on behalf of the application is deployed in the user space, wherein the server delay control device is further configured to create, between the application and the physical NIC, a communication path for communication via socket communication, the communication path comprising a first queue and a second queue, wherein the server delay control device comprises:
- a packet dequeuer configured to perform polling whether a packet has been enqueued into the first queue and to perform dequeuing the enqueued packet from the first queue;
- a converter configured to perform conversion of the packet dequeued from the first queue into a structure for managing a packet, and
- a packet enqueuer configured to perform enqueuing the dequeued packet on which the conversion has been performed by the converter into the second queue, wherein the packet dequeuer, the converter, and the packet enqueuer are configured such that the polling and the dequeuing by the packet dequeuer, the conversion by the converter, and the enqueuing by the packet enqueuer are performed in a single context without causing a context switch, wherein the Host OS is configured such that a virtual machine and an external process created outside the virtual machine operate on the Host OS, wherein the server further comprises a Guest OS configured to operate in the virtual machine, wherein the Guest OS comprises:
- a kernel, and
- a Socket, which is an interface for the kernel to perform inter-process communication, wherein the kernel comprises:
- a protocol processor configured to perform protocol processing, and
- a TAP device, which is a virtual interface created by the kernel, wherein the first queue comprises: a first transmission queue of the TAP device; and a first reception queue configured to hold a reception packet arrived at the server, the reception packet enqueued into the first reception queue, wherein the second queue comprises: a reception queue of the TAP device and a second transmission queue configured to hold a packet to be transmitted to an outside of the Guest OS, wherein the packet dequeuer is configured to perform polling whether the reception packet has been enqueued into the first reception queue and to perform dequeuing the reception packet from the first reception queue, wherein the converter is configured to perform first conversion of the reception packet dequeued from the first reception queue into a structure for the kernel to manage a packet, wherein the packet enqueuer is configured to perform enqueuing the dequeued reception packet on which the first conversion has been performed by the converter into the reception queue of the tap device, wherein the protocol processor is configured to perform the protocol processing on the reception packet enqueued into the reception queue of the TAP device without causing a software interrupt, wherein the kernel is configured to transfer the reception packet subjected to the protocol processing to the application via the Socket, wherein the packet dequeuer, the converter, the packet enqueuer, the protocol processor, and the kernel are configured such that the polling and the dequeuing performed on the reception packet by the packet dequeuer, the first conversion performed by the converter, the enqueuing performed on the reception packet by the packet enqueuer, the protocol processing performed on the reception packet by the protocol processor, and the transfer of the reception packet by the kernel are performed in a first single context without causing a context switch, wherein the protocol processor is configured to perform the protocol processing, in a second single context without causing a software interrupt, on a transmission packet received via the Socket from the application, wherein the kernel is configured to enqueue the transmission packet subjected to the protocol processing into the first transmission queue of the TAP device, wherein the packet dequeuer is configured to perform polling whether the transmission packet has been enqueued into the first transmission queue of the TAP device and to perform dequeuing the transmission packet from the first transmission queue of the TAP device, and wherein the converter is configured to perform second conversion of the transmission packet dequeued from the first transmission queue into a structure for the server delay control device to manage a packet, wherein the packet enqueuer is configured to enqueue the dequeued transmission packet on which the second conversion has been performed by the converter into the second transmission queue, wherein the packet dequeuer, the converter, and the packet enqueuer are configured such that the polling and the dequeuing performed on the transmission packet by the packet dequeuer, the second conversion performed by the converter, and the enqueuing performed on the transmission packet by the packet enqueuer are performed in a third single context without causing a context switch.

5. A server delay control device deployed on a server including a Host OS, a kernel, and a Socket, which is an interface for the kernel to perform inter-process communication via socket communication, the server implemented using a computer comprising one or more hardware processors, the server delay control device implemented using one or more of the one or more hardware processors and deployed in a user space that can be used by a user, wherein the server delay control device is configured to create, between the user space and a physical NIC connected to the Host OS, a communication path for communication via the socket communication, the communication path comprising a first queue and a second queue, wherein the server delay control device comprises:
a packet dequeuer configured to perform polling whether a packet has been enqueued into the first queue and to perform dequeuing the enqueued packet from the first queue;
a converter configured to perform conversion of the packet dequeued from the first queue into a structure for the kernel to manage a packet to be transferred via the Socket to the user space in a single context without causing a context switch, and
a packet enqueuer configured to enqueue the dequeued packet on which the conversion has been performed by the converter into the second queue, and wherein the packet dequeuer, the converter, and the packet enqueuer are configured such that the polling and the dequeuing by the packet dequeuer, the conversion by the converter, and the enqueuing by the packet enqueuer are performed in the single context without causing a context switch.

6. A server delay control method for a server delay control device deployed on a server including a Host OS, a kernel, and a Socket, which is an interface for the kernel to perform inter-process communication via socket communication, the server implemented using a computer comprising one or more hardware processors, the server delay control device implemented using one or more of the one or more hardware processors and deployed in a user space that can be used by a user, the server delay control device configured to create, between the user space and a physical NIC connected to the Host OS, a communication path for communication via the socket communication, the communication path comprising a first queue and a second queue, the server delay control method comprising steps of:
performing polling whether a packet has been enqueued into the first queue and performing dequeuing the enqueued packet from the first queue;
performing conversion of the packet dequeued from the first queue into a structure for the kernel to manage a packet to be transferred via the Socket to the user space in a single context without causing a context switch; and
enqueuing the dequeued packet on which the conversion has been performed into the second queue,
wherein the polling, the dequeuing, the conversion, and the enqueuing are performed in the single context without causing a context switch.

7. A non-transitory computer-readable medium storing a computer program for a computer serving as, on a server including a Host OS, a kernel, and a Socket, which is an interface for the kernel to perform inter-process communication via socket communication, a server delay control device deployed in a user space that can be used by a user, the computer comprising one or more hardware processors, the server delay control device implemented using one or more of the one or more hardware processors, the server delay control device configured to create, between the user space and a physical NIC connected to the Host OS, a communication path for communication via the socket communication, the communication path comprising a first queue and a second queue, the computer program causing the server delay control device to execute steps of:
performing polling whether a packet has been enqueued into the first queue and performing dequeuing the enqueued packet from the first queue;
performing conversion of the packet dequeued from the first queue into a structure for the kernel to manage a packet to be transferred via the Socket to the user space in a single context without causing a context switch; and
enqueuing the dequeued packet on which the conversion has been performed into the second queue,
wherein the server delay control device is configured such that the polling, the dequeuing, the conversion, and the enqueuing are performed in the single context without causing a context switch.

* * * * *